C. L. WILKINS.
AUTOMATIC CUT-OFF AND PRESSURE REGULATOR.
APPLICATION FILED MAR. 6, 1913.
1,191,640.
Patented July 18, 1916.
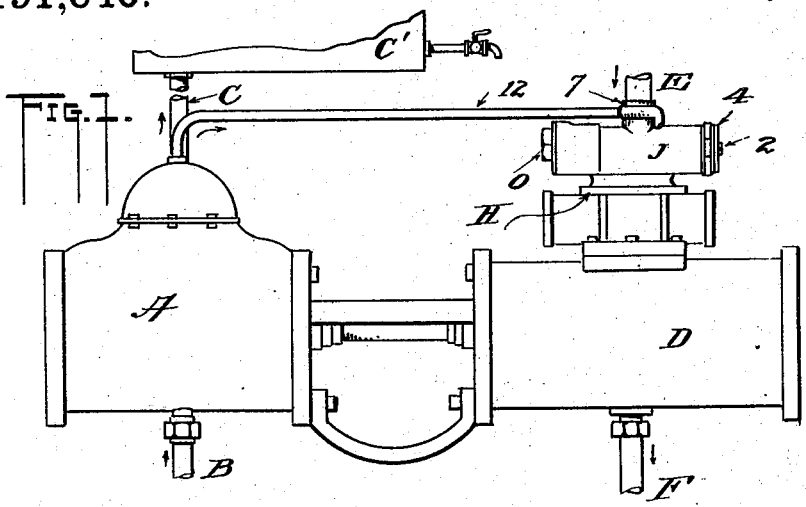
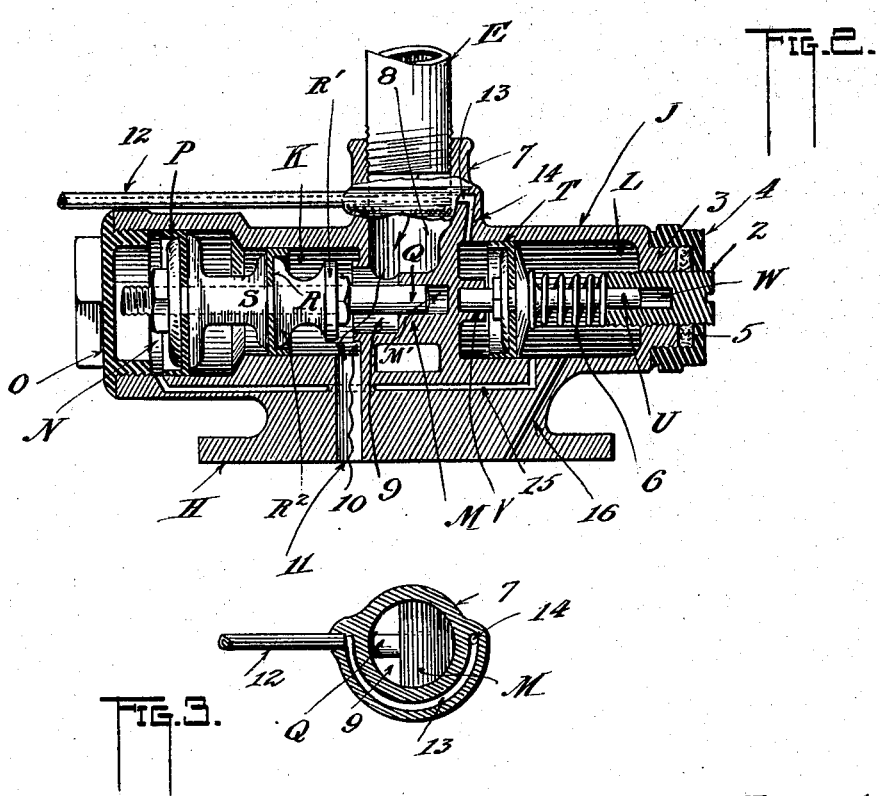
Witnesses:
Mabel E. Bradley
Eunice Beckum
Inventor:
Charles L. Wilkins,
By L. M. Hurlos, Atty.

UNITED STATES PATENT OFFICE.

CHARLES L. WILKINS, OF PEORIA, ILLINOIS.

AUTOMATIC CUT-OFF AND PRESSURE-REGULATOR.

1,191,640.

Specification of Letters Patent.

Patented July 18, 1916.

Application filed March 6, 1913. Serial No. 752,402.

*To all whom it may concern:*

Be it known that I, CHARLES L. WILKINS, citizen of the United States, residing at Peoria, in the county of Peoria and State of Illinois, have invented certain new and useful Improvements in Automatic Cut-Offs and Pressure-Regulators; and I do hereby declare that the following is a full, clear, and exact description of the invention, which will enable others skilled in the art to which is appertains to make and use the same.

This invention relates to an automatic cut-off valve and pressure regulator adapted for use with water-pumps, and pertains more particularly to a cut-off valve for use in water pumps operated by water-pressure from city mains for storing cistern water, or soft water, and in which the pump is in part controlled by back pressure from the stored water.

The system to which my invention is particularly applicable is that in which a motor is operated by pressure from city water mains to store soft water under pressure in a so called pressure tank, the cut-off valve for the motor being controlled by the pressure from said tank to cut off the city pressure to said motor when said tank pressure almost or quite equals the pressure of the said city pressure.

In some types of devices, to which the present invention relates where hard water is used to operate the valve to terminate the action of the pump, the structure is such that the hard water, which may also be more or less contaminated, may become mixed with the soft water being stored so that the stored soft water may become contaminated which, of course, tends to defeat the very purpose for which the pump is designed.

The object of my invention, therefore, is that, besides providing a quick acting cut-off valve-mechanism for a storage pump so that there will be no waste of operating pressure-water after the required amount of soft water is stored, and to relieve the pumping mechanism of unnecessary work, to so arrange the cut-off mechanism that the back pressure of the stored soft water instead of the operating pressure will be utilized to operate the said mechanism. By this means the soft water, because the operating source for the termination of the pumping operation, flows from the soft water storage apparatus, instead of the pump-operating or driving pressure flowing toward the soft water and mixing therewith.

In order that my invention can be fully understood I have provided the accompanying drawing in which, Figure 1 is an elevation of a water pump with my invention in connection therewith. Fig. 2 is a vertical longitudinal section of my improved cut-off valve, and Fig. 3 is a horizontal section of a portion of the valve.

The pump comprises a cylinder A having a suction pipe B leading to a cistern or other source of soft water supply, and C is a pipe leading to the pressure storage tank shown at C'.

The motor cylinder is represented at D, while at E is the supply pipe to said cylinder for the city water pressure, F being a pipe for the spent water from said motor cylinder.

H represents any suitable base for attachment to a part of the cylinder D, and having a cylindrical portion J as a part thereof, said portion and base being cast as a single piece merely as a preferred construction. The cylindrical portion is provided with two bores K, L, separated by a wall M. The bore K is enlarged at its outer end as indicated at N and the latter is closed by a screw cap or plug O.

P R is a differential piston lying within the bore N K. It comprises a cupped leather carried on a piston-rod Q, facing the cap O, and a similar leather facing in the opposite direction, the two leathers being spaced apart on said rod by a suitable part S and otherwise being properly secured by suitable means not necessary to describe since well known in the art.

The piston P not only serves in the capacity to be described, but also acts as a guide for the piston-rod at that end while the rod itself at its inner end is guided in a bore or socket M' extending into the wall M of the valve body.

In addition to the pistons referred to there is a suitable disk R' carried by the piston-rod Q which is backed against a member R² by which said piston R and said disk are spaced from one another.

Within the bore L before referred to is a piston, preferably a cupped leather T carried by a piston rod U, one end of which is guided in a socket V of the wall M. The other end of the piston rod is guided in a socket W in an adjustable member 2 threaded exteriorly and adapted to screw into the outer wall 3 of the cylindrical portion J. Surrounding said member is a cap 4 inclosing a suitable packing 5 to prevent leakage of water around said member but allowing the latter to project so that it may be adjusted as required.

A spring 6 is interposed between the piston and the member 2 and the adjustment of latter by means of its threads admits of placing any desired tension upon said spring.

The portion J preferably has an extension 7 with which the pipe E previously referred to is connected, and within the wall M is a passage 8 which is extended into a second communicating passage 9 opening through the side of the wall M into the bore K, there being an annular projection 10 extending from said wall providing a seat for the disk R' which it will be seen presently is in reality a valve. Communicating with the bore K is a passage 11 which has communication also with the motor cylinder D.

12 is a conduit connected at one end with the soft water cylinder A, its other end having connection through suitable passages 13 and 14 with the bore L between the wall M and the piston T.

15 is a passage connecting with the bore L between the said piston T and the end wall 3, the said piston T normally lying between the openings of the two passages, while the said passage 15 terminates at and communicates with the bore N outward from the piston P.

16 is a passage connecting the bore L with any place of discharge through the base H.

In practice the spring 6 is adjusted by means of the member 2 so that the piston T will require a certain pressure of water against it to operate and overcome said spring, the operating pressure thereto being that derived from the storage tank for the soft water.

Now, as arranged in Fig. 2 the water is flowing through the pipe E and passages 8, 9, into the bore K, thence through the passage 11 to the motor the latter being in operation in consequence. As the soft water pressure now approaches its highest point the water from the tank is forced through the conduit 12 and passages 13 and 14 into the bore L moving the piston T against its spring and gradually forcing the piston to a position to expose the mouth of the passage 15 and thus bring it into communication with the passage 14. The pressure is now immediately carried through said passage 15 to the outer portion of the large bore N acting at once on the piston P which is free to move against the pressure of the city water upon the disk or valve R'. The very large area of the portion P upon which the soft water acts as compared with that against which the city water operates, is such that the pressure from the passage 15 can operate it and shut off the city pressure through the disk or valve easily and almost instantly, the operation of the motor being interrupted suddenly. This condition is maintained as long as the pressure in the tank remains substantially at its maximum. If, however, the pressure is relieved by drawing water from one of the soft water fixtures supplied from the tank, the pressure is at once removed from the piston T. The spring 6 now at once returns the piston to its first position whereupon the passage 15 is relieved of pressure into the bore L, the water finding its way out through the passage 16. The pressure being removed from the piston P, the city pressure returns said piston and the piston R to the first position; the motor being instantly set in motion at its maximum capacity. As the pressure gradually reaches its highest point in the soft water tank, that pressure is gradually placed upon the piston T until having passed the mouth of the passage 15 the valve R' is closed with a rush or in a substantially instantaneous manner. Therefore, the gradual slowing down of the motor is absent; the gradual movement being transferred to the piston T instead. That is to say, the gradual movement due to the gradually increasing pressure is still present but it is transferred from the motor to the valve T after which the extreme pressure is transferred to the valve R' to close it. The free action of the pistons P and R and the quick exposure of the passage 15 together with the resulting quick reduction of pressure behind the said piston P permits the full head of city pressure to assert itself.

The adjustment of the spring 6 admits of electing the pressure to be obtained in the pressure tank while the operation is always the same—absolutely quick and positive.

It is a well known fact that valve leathers used in the construction of pumps after a time become worn, and therefore do not fit the valve cylinder tightly, allowing a certain amount of water to pass by them. The water increases in volume as time goes on since once a leak is started, the avenue for the escape of the water is gradually enlarged even extending to cutting deeply into the metal of the cylinder. Therefore in former types of cut-off valves if it so happens that but a very small amount of soft water is withdrawn at any time from the tank or an amount that is not sufficient to start the motor the valve will only very slightly open allowing the city pressure which is often a very high pressure, to leak past it for perhaps a long period of time, overnight, for example, or when the system may not be used for a day or two after such withdrawal. The result is that the passing of the water at high pressure for so long a time gradually but surely cuts the parts deeper and deeper until at some time the utility of the pump is destroyed.

With my device it is impossible for these conditions to be brought about. In its normal position or during the time the system is in operation the valve R' is closed. Leaks cannot occur at the said valve since back pressure holds it absolutely shut. If any amount of water is withdrawn, no matter how small, it does not cause the valve to open but the piston T due to its spring 6 is gradually forced back toward the position shown in the drawing as the water is drawn until the pressure in the tank has been reduced, finally, to a sufficient extent to permit the said piston T to uncover the passage 15 so that said passage 15 can then communicate with the exhaust passage 16 which relieves the pressure from behind the piston P, the city pressure then being able to instantly open the valve R', there not now being any back pressure whatever to prevent this action.

The structure illustrated in Fig. 2 may be manufactured as an attachment for many types of combined water motors and pumps and for water storage systems and may be sold separately for that purpose.

Various changes may be made in the device without departing from the spirit or intent of the invention.

A point of great importance is that the structure herein shown and described comprises two absolutely separate compartments which have no connection with one another or at least such a connection with one another that the city water or hard water can in any way find passage to the soft water system and reach the soft water in the reservoir C' to contaminate it. The wall or diaphragm, M, therefore, absolutely separates the two cavities and these are connected only by a passage for soft water which alone operates the differential piston to close its valve R' upon the seat 10.

As distinguished from the art, soft water only due to back pressure from the reservoir C' is employed to operate the differential piston to close the said valve R' against the city pressure and by the arrangement used there can be no commingling of the hard and soft water to the detriment of the latter. The soft water if it passes the differential piston into the hard water will harm nothing but the hard water cannot get back to the soft water from the fact that should it by chance pass into the cavity L it would be merely discharged through the vent passage 16.

The two different waters must be kept separate from one another so that the one will not contaminate the other. The wall or diaphragm M together with the use of the soft water to change the relation of the differential piston and its valve makes this result possible.

Having described my invention, I claim:—

1. In combination with a system for storing soft water including a soft water reservoir and means operated by city water pressure to store soft water under pressure in said reservoir, of a cut-off mechanism comprising a part having a cavity and including an imperforate diaphragm separating said cavity into two separate independent compartments, there being an inlet passage communicating with one of the compartments for the introduction of city pressure thereto, there also being an outlet from said compartment for the delivery therefrom of said city pressure, a differential piston in said compartment including therewith a valve to close the said inlet passage, there being a passage connecting the other of the compartments with the reservoir for the introduction of soft water to said compartment, there also being a second passage connecting that compartment with the first described compartment behind the large end of said differential piston, the latter lying between the inlet of said passage and the described inlet for the city water, a piston in the soft water compartment, means to hold it in an elastic manner normally between and separating the two passages of that compartment, said piston adapted to be operated by back pressure of soft water for the reservoir to move it against the said means and expose the passage leading to the compartment having the differential piston whereby to direct the soft water through said passage upon the said differential piston to close the valve thereof and cut off the flow of said city pressure.

2. In combination with a system for storing soft water including a soft water reservoir and means operated by pressure-water of a different source to store water under pressure in said reservoir, of a cut-off mechanism comprising a part having a cavity and including an imperforate diaphragm or wall separating said cavity into two independent compartments, one for soft water and the other for the pressure-water whereby the two waters are kept entirely separate from one another, there being an inlet passage including a valve seat, and connected with one of the compartments for the introduction of operating pressure-water thereto, there also being an outlet from said compartment for said operating pressure-water to said means, there being a conduit for soft water connecting the reservoir with the other compartment, there also being a second conduit connecting the last named compartment with the first described compartment for conducting soft water thereto, a piston in said other compartment normally positioned between the inlet and outlets of the conduit thereof, means to elastically hold said piston in said position, a differential piston lying in the said first described compartment between the opening of the soft water conduit and the described valve seat and including a valve to seat upon the latter, the large end of the piston lying in that portion of the compartment having the opening of said conduit, the back pressure from the reservoir adapted when it has reached a predetermined point, or that substantially equaling that of the pressure-water, to operate the piston in the compartment for soft water to direct the flow of soft water against the differential piston and stop the flow of pressure-water.

In testimony whereof I affix my signature, in presence of two witnesses.

CHARLES L. WILKINS.

Witnesses:
W. I. SLEMMONS,
L. M. THURLOW.

Copies of this patent may be obtained for five cents each, by addressing the "Commissioner of Patents, Washington, D. C."